United States Patent
Ribeiro et al.

(10) Patent No.: US 11,597,514 B2
(45) Date of Patent: Mar. 7, 2023

(54) UNMANNED AIRCRAFT HAVING REDUCED ACOUSTIC SIGNATURES

(71) Applicant: EMBRAER S.A., São José dos Campos-SP (BR)

(72) Inventors: Raphael Felipe Gama Ribeiro, São José dos Campos (BR); Tarik Hadura Orra, São José dos Campos (BR)

(73) Assignee: EMBRAER S.A., São José Dos Campos-SP (BR)

(*) Notice: Subject to any disclaimer, the term of this patent is extended or adjusted under 35 U.S.C. 154(b) by 636 days.

(21) Appl. No.: 16/542,524

(22) Filed: Aug. 16, 2019

(65) Prior Publication Data

US 2021/0047047 A1 Feb. 18, 2021

(51) Int. Cl.
*B64C 39/02* (2006.01)
*B64D 27/02* (2006.01)

(52) U.S. Cl.
CPC .......... *B64C 39/024* (2013.01); *B64D 27/02* (2013.01); *B64C 2201/021* (2013.01); *B64C 2201/165* (2013.01); *B64C 2220/00* (2013.01); *B64D 2027/026* (2013.01)

(58) Field of Classification Search
CPC .......... B64C 2220/00; B64C 2201/021; B64C 11/18; B64C 11/46; B64C 11/48; B64D 2027/026

See application file for complete search history.

(56) References Cited

U.S. PATENT DOCUMENTS

| | | | | |
|---|---|---|---|---|
| 9,527,597 | B1* | 12/2016 | Sada | B64D 37/04 |
| 10,377,488 | B1* | 8/2019 | Reusch | B64C 3/185 |
| 2015/0147181 | A1* | 5/2015 | Henze | B64C 11/18 |
| | | | | 416/215 |
| 2019/0291860 | A1* | 9/2019 | Morgan | B64D 35/04 |
| 2020/0017228 | A1* | 1/2020 | Combs | B64D 31/02 |
| 2020/0223537 | A1* | 7/2020 | Wittmaak | B64C 39/024 |
| 2020/0391862 | A1* | 12/2020 | Groninga | B64C 29/0033 |

* cited by examiner

*Primary Examiner* — Richard Green
*Assistant Examiner* — Arfan Y. Sinaki
(74) *Attorney, Agent, or Firm* — Nixon & Vanderhye P.C.

(57) ABSTRACT

Unmanned aircraft have aligned forward and aft propulsion systems possessing different performance and/or noise characteristics. According to some embodiments, unmanned aircraft have a forward engine and a forward tractor propeller and an aft engine and an aft pusher propeller. Selected ones of forward and aft propulsion systems will thus be provided to have greater and lesser operational flight performance characteristics and greater and lesser noise signature characteristics, respectively, as compared to the other. For example, the forward propulsion system may be provided with the greater operational flight performance and higher signature characteristics as compared to the aft propulsion system, while conversely the aft propulsion system may be provided with a lesser flight performance and lower noise signature characteristics as compared to the forward propulsion system.

6 Claims, 3 Drawing Sheets

UNMANNED AIRCRAFT HAVING REDUCED ACOUSTIC SIGNATURES

CROSS-REFERENCE TO RELATED APPLICATION

The present application is related to U.S. Design patent application Ser. No. 29/702,045 filed on Aug. 16, 2019 entitled "Design For: Unmanned Aircraft", the entire contents of which are expressly incorporated hereinto by reference.

FIELD

The embodiments disclosed herein relate generally to unmanned aircraft systems (UAS). In specific embodiments, the present invention is directed to UAS having reduced acoustic signatures.

BACKGROUND

Unmanned aircraft systems (UAS) colloquially known as "drones" have obtained increased importance in the armed forces of many countries due to several desirable characteristics including, for example, (i) high autonomy, range and time on station abilities, (ii) advanced intelligence, surveillance and reconnaissance systems, (iii) adequate flight envelope, reduced observability both acoustically and by radar, and (iv) systems reliability (i.e., reliability of the data links with remotely-based controllers/pilots on which the UAS depend for flight mission accomplishments).

The vast majority of conventional UAS platforms are single engine, pusher propulsive layouts. Although such a conventional solution has several advantages, most notable is that only one propulsion system is required, it has less variables for optimization and decreased reliability as compared to a multi-engine design. For example, the propeller of single engine UAS must be optimized so as to concurrently maximize performance and decrease acoustic signature. Such a design requirement may be quite challenging since conflicting requirements may appear while optimizing the propeller design, e.g., tip speed, chord distribution, activity factor, diameter, and the number of blades, among other parameters.

The single engine design for conventional UAS also reduces the design space for hybrid electric propulsion, since a greater number of hybrid propulsion architectures can be considered for a multi-engine UAS design layout.

Therefore, one significant technical problem which the embodiments describe herein address is to de-couple the design restrictions described above from the aircraft design, thereby enabling a multi-engine propulsion concept for UAS with increased performance and decreased noise signature to be realized, while also enabling the conceptualization of a quieter hybrid-electric propulsion (HEP) architecture. It is therefore towards providing solutions so such a problem that the embodiments described herein are directed.

BRIEF DESCRIPTION OF EMBODIMENTS

Generally, the embodiments disclosed herein are directed toward unmanned aircraft having aligned propulsion systems having different performance and/or noise characteristics. More specifically, according to some embodiments, unmanned aircraft are provided having a forward propulsion system comprising a forward engine and a forward tractor propeller and an aft propulsion system comprising an aft engine and an aft pusher propeller. Selected ones of forward and aft propulsion systems will thus be provided to have greater and lesser operational flight performance characteristics and/or greater and lesser noise signature characteristics, respectively, as compared to the other. By way of examples, the forward propulsion system may be provided with the greater operational flight performance and/or non-optimized noise signature characteristics as compared to the aft propulsion system, while conversely the aft propulsion system may be provided with a lesser flight performance and/or decreased noise signature characteristics as compared to the forward propulsion system.

A mode controller is preferably provided so as to allow for the controllably operation of the forward and/or aft engines and the forward tractor and/or aft pusher propellers in order to achieve at least first and second flight performance modes having greater and lesser noise characteristics. For example, the first flight performance mode may comprise a take-off and/or climb flight phase of the unmanned aircraft in which both the forward tractor and aft pusher propellers are in a thrust condition to provide thrust to the unmanned aircraft, while the second flight performance mode may comprise a quiet loiter flight phase of the unmanned aircraft in which the forward tractor propeller is in a feathered condition to provide no thrust to the unmanned aircraft and the aft pusher propeller, optimized for minimum noise signature, is in a thrust condition to provide thrust to the unmanned aircraft.

Thus, the unmanned aircraft may provide a variety of combinations of propulsive systems and propeller types so as to achieve the differential performance/noise characteristics between the forward and aft propulsion systems and thereby attain a variety of in-flight modes where increased flight performance or reduced in flight noise can be selected.

In one embodiment, the unmanned aircraft will include port and starboard fuselage booms and a central mid-wing airfoil joining the fuselage booms. Port and starboard wings are provided so as to extend outwardly from the port and starboard fuselage booms, respectively. A propulsion control pod supported by the central mid-wing airfoil is aligned with a central axis of the unmanned aircraft and includes forward and aft ends housing the forward and aft propulsion systems, respectively. An inverted V-shaped empennage is positioned between an aft portion of the port and starboard fuselage booms so as to provide yaw and pitch control to the aircraft.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
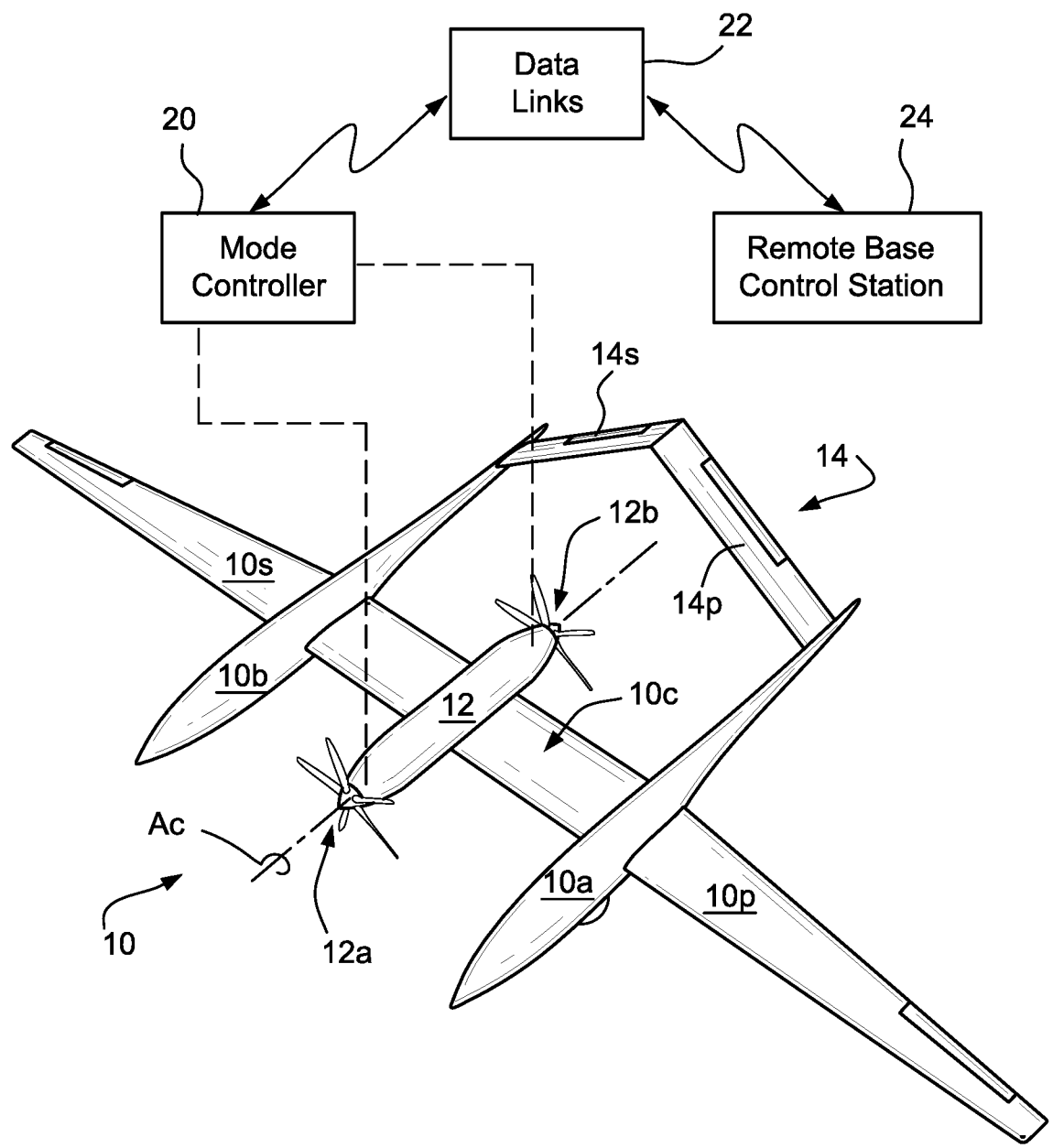
FIG. 1 is a left front perspective view of a UAS in accordance with an embodiment of the present invention.

Accompanying FIG. 1 depicts a UAS 10 in accordance with an embodiment of the invention. In this connection, it will be observed that the UAS 10 is twin-engine, push-pull propulsive layout having a forward tractor propeller propulsion system 12a and an aft pusher propeller propulsion system 12b coaxially aligned with one another relative to the central longitudinal axis Ac of the UAS 10. The UAS 10 is configured to have twin fuselage booms 10a, 10b joined by a central mid-wing airfoil 10c. Port and starboard wings 10p, 10s extend laterally (relative to the longitudinal axis Ac) from their respective fuselage boom 10a, 10b. The tractor and pusher propeller propulsion systems 12a, 12b are housed at the forward and aft ends, respectively, of the propulsion control pod 12 supported by the mid-wing 10c. The empennage 14 of the UAS 10 includes port and starboard ruddervators 14p, 14s which upwardly and inwardly extend toward one another from the respective fuselage booms 10a, 10b so as to converge at an apex junction thereby forming an inverted V-shaped pitch and yaw control surface.

The UAS 10 includes an on-board controller 20 operably connected to the on-board systems, including the propulsive systems 12a, 12b, the fuel management systems, flight control servos and the like. An on-board mode controller 20 communicates via data links 22 (e.g., satellite or earth-based communications hubs) to a remote base control station 24 (e.g., a ground-, air- or naval-based control station providing human and/or computer control input to the UAS 10 to allow accomplishment of the flight mission) in order to allow propulsion mode control in a manner described below. As is known, an on-board flight controller (not shown) may also be connected to the control station 24 via the data links 22 to allow an operator to control the flight characteristics and profile of the UAS 10. The mode controller 20 and/or the flight controller may also be pre-programmed to permit autonomous flight of the UAS 10 for a specific airborne mission.

The propulsion systems 12a, 12b can be a variety of engine types and may include thermal engines, e.g., internal combustion in-line engines, rotating or reciprocating piston engines, gas turbine engines or the like. As seen in the embodiment schematically depicted by FIG. 2, each of the propulsion systems 12a, 12b will include respective mated engines and propellers 12a-1, 12b-1 and 12a-2, 12b-2, respectively.

Figure 2:
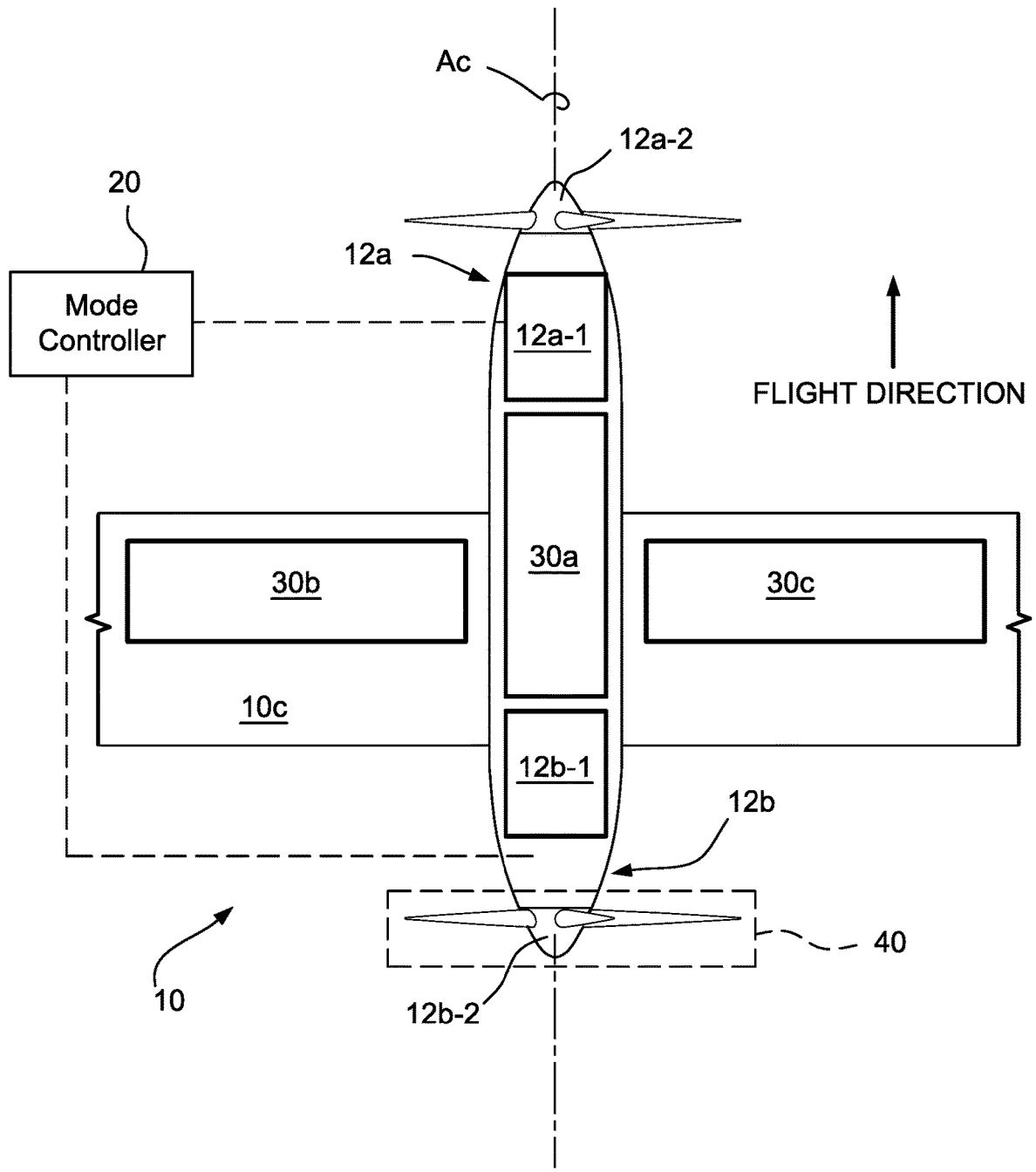
FIG. 2 is a schematic partial top plan view of the UAS shown in FIG. 1.

In the embodiment of FIG. 2, the engines 12a-1, 12b-1 are combustion engines (e.g., internal combustion piston engines, turbine engines a combination thereof) that are supplied with suitable fuel for operation by on-board fuel tanks 30a, 30b and 30c. Therefore, the propulsion systems 12a, 12b can be provided with a specific engine/propeller combination so as to be optimized for a specific objective function. By way of example, the forward engine 12a-1/tractor propeller 12a-2 can be optimized for maximum performance, while aft engine 12b-1/pusher propeller 12b-2 can be optimized for minimum noise. The inverse functions could also of course be provided, i.e., the forward engine 12a-1/tractor propeller 12a-2 could be provided for optimum minimum noise characteristic while the aft engine 12b-1/pusher propeller 12b-2 could be provided for optimum maximum performance characteristics.

Those skilled in this art will understand that the noise from the propellers 12a-2, 12b-2 will dominate over the noise of the respective engines 12a-1, 12b-1. Therefore, the propellers 12a-2, 12b-2 represent the on-board equipment where there is a greater opportunity for noise reduction optimization. Those skilled in this art will also understand that propellers optimized for minimum noise characteristics can be quite different from propellers optimized for maximum flight performance characteristics. In order to minimize noise, the propeller must exhibit a decreased airfoil loading by, for example, increasing the number of blades and blade chord or by the activity factor, while also having a decreased rotational speed.

By providing two independently optimized propulsion systems 12a, 12b, the UAS 10 in accordance with the embodiments herein can thus operate in both "maximum performance" and "quiet power" modes when necessary by suitable operational commands issued by the mode controller 20. While in a "maximum performance mode", both propulsion systems 12a, 12b can thus be commanded to be operational, providing the maximum thrust possible for a given amount of power input. While in "quiet power" mode, however, that one of the engine/propeller combinations 12a-1/12a-2 or 12b-1/12b-2 as the case may be that is designed to be the "maximum performance" engine/propeller combination can be inactivated (e.g., by complete engine shut down and/or by feathering the propeller). While in the "quiet mode", the UAS 10 may then powered by one of the propulsion systems 12a or 12b having the engine/propeller combination designated as the "minimum noise" propulsion system thereby taking full advantage of the minimum noise optimization criteria. One possible operational grid that can be commanded by the mode controller 20 whereby the forward propulsion system 12a is provided with the "maximum performance" engine/propeller combination 12a-1/12a-2, while the aft propulsion system 12b is provided with the "minimum noise" engine/propeller combination 12b-1/12b-2 is summarized below in Table 1 over several flight phases of the UAS 10.

TABLE 1

Flight phases and System Operation (FIG. 2)

| Flight Phase | Engine 12a-1 | Engine 12b-1 | Propeller 12a-2 | Propeller 12b-2 |
| --- | --- | --- | --- | --- |
| Take-Off | On | On | Thrust | Thrust |
| Climb | On | On | Thrust | Thrust |
| Dash Cruise | On | On | Thrust | Thrust |
| Quiet Loiter | Off | On | Feather | Thrust |

Those skilled in the aeronautical arts will recognize that when a propeller is in a thrust condition, then thrust forces are being generated by that propeller to counteract the drag forces associated with the aircraft. Conversely, when a propeller is in a feathered condition, that propeller is providing no thrust forces to counteract the draft forces associated with the aircraft. The pitch of a controllable propeller of the variety employed in the embodiments herein can therefore be selective adjusted to provide the proper propeller angles of attack to develop desired thrust during various flight phases or be feathered to provide no thrust. During propeller feathered conditions, the associate engine may or may not be shut down since operation of the engine will not affect whether or not the propeller is generating thrust. However, in view of increased fuel efficiency (and hence range), it is typically desirable to have the engine shut down when a propeller associated with that engine is in a feathered condition.

An additional optional feature is the installation of a duct around the minimum noise propeller, further decreasing the aircraft acoustic signature. In accordance with the embodiment of FIG. 2 described above, therefore, a duct 40 is installed around the aft propeller 12b-2 since the after propulsion system 12b having the engine/propeller combination 12b-1/12b-2 is designed to be the minimum noise propulsion system as compared to the forward engine/propeller combination 12a-1/12a-2. The duct 40 can be provided with suitable known acoustic linings (e.g., passive attenuation systems) which can be very effective at decreasing specific noise frequencies associated with the propeller 12b-2. Logically of course the skilled person will realize that the adoption or not of the duct 40 must be a conclusion made for any particular form of the UAS 10 from a comprehensive design study taking into account the intended mission requirements since the duct 40 will necessarily disadvantageously increase cost, drag, weight and complexity, while advantageously contributing to a decrease in external noise.

Figure 3:
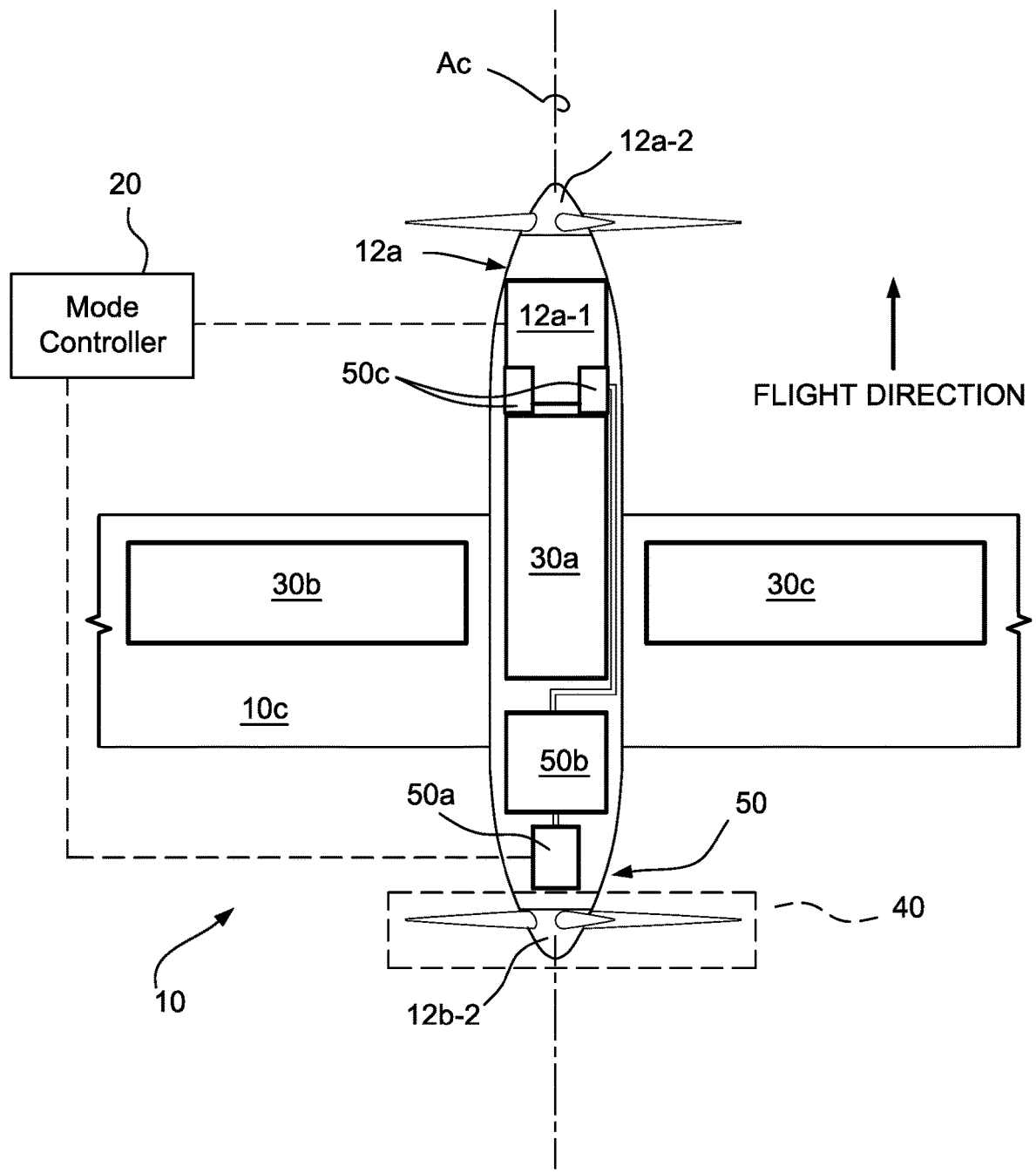
FIG. 3 is a schematic partial top plan of another UAS in accordance with an embodiment of the present invention.

A hybrid propulsion system is shown in accompanying FIG. 3 whereby the aft combustion propulsion system 12b is replaced by an electrically powered propulsion system 50 having an on-board electric motor 50a powered by stored electrical energy in a battery pack 50b. Generators 50c are operatively associated with the forward combustion engine 12a-1 and electrically interconnected to the battery pack 50b so as to maintain and/or replenish stored electrical power by the battery pack 50b when the forward engine 12a-1 is operated. Since the generators 50c associated with the engine 12a-1 can recharge the battery pack 50b in-flight, the actual size of the battery pack 50b can be relatively small since it could be discharged and recharged several times by the generators 50c during a specific mission. The fuel tanks 30a-30c may also be sized so as to provide optimum range since they only need to provide fuel to the forward combustion engine 12a-1 of the propulsion system 12a.

As is known, an electric motor 50a is much quieter than a comparably powered combustion engine. Thus, with the embodiment provided by FIG. 3, the noise-optimized propeller 12b-2 driven by the electric motor 50a can be an extremely silent propulsion system for the a quiet power mode of operation. The possible operational modes of the embodiment of UAS 10 depicted in FIG. 3 over several flight phases are summarized below in Table 2.

TABLE 2

Flight phases and System Operation (FIG. 3)

| Flight Phase | Engine 12a-1 | Generators 50c | Battery Pack 50b | Electric Motor 50a | Propeller 12a-2 | Propeller 12b-2 |
|---|---|---|---|---|---|---|
| Take-Off | On | On | Use | On | Thrust | Thrust |
| Climb | On | On | Recharge | On | Thrust | Thrust |
| Cruise-1 | On | On | Recharge | On | Thrust | Thrust |
| Cruise-2 | On | On | Recharge | Off | Thrust | Feather |
| Quiet Loiter | Off | Off | Use | On | Feather | Thrust |

Similar to the all combustion engine embodiment of FIG. 2 and for a similar functional purpose, the hybrid propulsion embodiment of FIG. 3 can optionally be provided with a duct 40 enclosing the aft propeller 12b-2.

As discussed hereinabove, the low acoustic signature of any UAS is very important for its operational mission for which it was designed. The proposed embodiments discussed above therefore aim to reduce the noise signature of the UAS 10 thereby providing valuable acoustic stealth characteristics.

Therefore, while reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An unmanned aircraft comprising:

port and starboard fuselage booms aligned parallel to a central axis of the unmanned aircraft and each having respective forward and aft end portions;

a central mid-wing airfoil joining a mid-portion of each of the port and starboard fuselage booms such that each of the port and starboard fuselage booms extends forwardly and rearwardly from the central mid-wing parallel to the central axis of the unmanned aircraft;

port and starboard wings aligned with the central mid-wing airfoil and extending outwardly from the port and starboard fuselage booms, respectively;

an inverted V-shaped empennage positioned between and interconnecting the aft end portions of the port and starboard fuselage booms;

a propulsion control pod supported by the central mid-wing airfoil which is aligned with the central axis of the unmanned aircraft and includes forward and aft ends that terminate between the port and starboard fuselage booms such that the forward and aft end portions of the port and starboard fuselage booms extend respectively in forward and rearward directions beyond the forward and aft ends of the propulsion control pod;

fuel tanks positioned in at least one of the central mid-wing airfoil and the propulsion control pod; and coaxially aligned forward and aft propulsion systems which are housed within the forward and aft ends of the propulsion control pod, respectively, the forward and aft propulsion systems providing thrust along the central axis of the unmanned aircraft when commanded, wherein the forward propulsion system comprises a forward engine and a forward tractor propeller, and the aft propulsion system comprises an aft engine and an aft pusher propeller, and wherein at least one of the forward and aft engines comprises an internal combustion engine operationally provided with fuel from the fuel tanks, and wherein one of the forward tractor propeller and the aft pusher propeller has a greater operational flight performance characteristic and a higher noise signature characteristic and another of the forward tractor propeller and aft pusher propeller has a lesser operational flight performance characteristic and a lower noise signature characteristic, and a mode controller for controllably operating the forward and/or aft engines and the forward tractor and/or aft pusher propellers in order to achieve at least first and second flight performance modes having greater and lesser noise characteristics, wherein (i) the first flight performance mode comprises a take-off and/or climb flight phase of the unmanned aircraft in which both the forward tractor and aft pusher propellers are in a thrust condition to provide thrust to the unmanned aircraft, and wherein (ii) the second flight performance mode comprises a quiet loiter flight phase of the unmanned aircraft in which the forward tractor propeller is in a feathered condition to provide no thrust to the unmanned aircraft and the aft pusher propeller is in a thrust condition to provide thrust to the unmanned aircraft.

2. The unmanned aircraft according to claim 1, wherein the forward tractor propeller has the greater operational flight performance and the higher noise signature characteristic, and the aft pusher propeller has the lesser flight performance characteristic and the lower noise signature characteristic.

3. The unmanned aircraft according to claim 1, further comprising a duct enclosing the aft pusher propeller.

4. The unmanned aircraft according to claim 1, wherein one of the forward and aft engines is the internal combustion engine and another of the forward and aft engines is an electric motor.

5. The unmanned aircraft according to claim 4, further comprising an on-board battery pack to power the electric motor.

6. The unmanned aircraft according to claim 5, further comprising a generator associated with the combustion engine which is electrically connected to the on-board battery pack to recharge the battery pack when the combustion engine is operating.

* * * * *